United States Patent [19]
Kase et al.

[11] Patent Number: 5,925,453
[45] Date of Patent: Jul. 20, 1999

[54] WINDOW FILM

[75] Inventors: Masanori Kase, Kanagawa; Hironobu Akiyama, Urawa, both of Japan

[73] Assignee: Lintec Corporation, Tokyo, Japan

[21] Appl. No.: 08/819,384

[22] Filed: Mar. 17, 1997

[30] Foreign Application Priority Data

Mar. 19, 1996 [JP] Japan ................................ 8-089066

[51] Int. Cl.⁶ .................................................. B32B 5/16
[52] U.S. Cl. ...................... 428/323; 428/328; 428/333; 428/340; 428/341; 428/426; 428/913
[58] Field of Search ...................... 428/323, 328, 428/426, 913, 333, 340, 341

[56] References Cited

U.S. PATENT DOCUMENTS

| | | | |
|---|---|---|---|
| 3,591,248 | 7/1971 | Meunier | 350/1 |
| 3,925,945 | 12/1975 | White | 52/171 |
| 4,081,934 | 4/1978 | Franz | 52/171 |
| 4,381,333 | 4/1983 | Stewart et al. | 428/312.6 |
| 4,963,206 | 10/1990 | Schacklette et al. | 156/99 |
| 5,362,689 | 11/1994 | Morimoto et al. | 501/70 |

*Primary Examiner*—H. Thi Le
*Attorney, Agent, or Firm*—Levy & Grandinetti

[57] ABSTRACT

A window film is disclosed. The window film comprises a light reflecting layer and an infrared absorbing layer. The window film can minimize the reflection of infrared rays and reduce the intensity of condensed infrared rays, even when the inside surface of a curved glass window is irradiated by sunlight.

18 Claims, 1 Drawing Sheet

WINDOW FILM

BACKGROUND OF THE INVENTION

1. Field of the Invention

The present invention relates to a window film. Specifically, the invention relates to a window film that absorbs infrared rays.

2. Description of Related Art

Light reflecting window films have been adhered to glass windows, such as, automotive window panes. Such light reflecting window films are useful in that they reflect sunlight, especially infrared rays, and prevent room temperatures from rising.

In recent years, curved glass has been used as glass windows for recreation vehicles and the like, and light reflecting window films have frequently been adhered to the inside (concave) surface of the curved glass.

If a door with a curved glass window is kept open, sunlight can irradiate the light reflecting window film adhered to the inside, concave, surface of the curved glass window and light that is reflected and condensed thereby can cause interior materials to burn.

In order to prevent the reflection of light from the inside, concave, surface of a light reflecting window film, the application of mat paint or black colored paint has been considered. However, these methods also prevent light from transmitting. Accordingly, seeing outside from the inside of a room or vehicle becomes difficult and practical use of these methods has proven to be difficult.

SUMMARY OF THE INVENTION

The present invention relates to a window film that minimizes the reflection of infrared rays and reduces the intensity of condensed infrared rays, even when the inside, concave, surface of a curved glass window is irradiated by sunlight.

The inventors of the present invention studied the above problems and found that the problems could be solved by adhering a window film comprising a light reflecting layer and an infrared absorbing layer to the inside, concave, surface of a curved glass window, with the light reflecting layer inside and the infrared absorbing layer outside.

The present invention thus provides a window film comprising a light reflecting layer and an infrared absorbing layer.

In another aspect, the present invention provides a window film comprising an infrared absorbing layer provided on one surface of a light reflecting layer and an adhesive layer provided on the other surface of the light reflecting layer.

In still another aspect, the present invention provides a window film comprising an infrared absorbing layer provided on one surface of a light reflecting layer via an intervening transparent base film and an adhesive layer provided on the other surface of the light reflecting layer.

In yet another aspect, the present invention provides a window film comprising an infrared absorbing layer provided on one surface of a light reflecting layer and an adhesive layer provided on the other surface of the light reflecting layer via an intervening transparent base film.

DESCRIPTION OF THE PREFERRED EMBODIMENTS

Figure 1:
FIG. 1 shows a sectional view of an embodiment of a window film according to the present invention.

The light reflecting layer of the window film of the present invention does not reflect all visible light, but reflects a part or most of the visible light and transmits the rest of the visible light. The visible light transmittance of the light reflecting layer is preferably about 10 to about 80 percent, more preferably, about 15 to about 55 percent.

Examples of light reflecting layers include metal vapor deposited layers, metal sputtered layers, ion plated layers, metal powder incorporated layers, electrical plated layers, and chemical plated layers, of which metal deposited layers are preferred. Metals that can be used in these layers include, for example, aluminum, gold, silver, copper, nickel, cobalt, chromium, tin, and indium, of which aluminum is preferred.

The thickness of the light reflecting layer is preferably in the range of from about 0.001 to about 0.1 micrometer, more preferably in the range of from about 0.005 to about 0.05 micrometer.

The infrared absorbing layer of the window film of the present invention is a layer that can absorb infrared rays with an infrared absorbency of, preferably, about 80 percent or more, more preferably, about 90 percent or more. The infrared absorbing layer is required to transmit visible light, and the transmittance of visible light is, preferably, about 50 percent or more preferably, about 60 percent or more.

Examples of infrared absorbing layers include a layer containing an infrared absorbing agent, more specifically, a transparent base film layer in which an infrared absorbing agent is incorporated, a coat layer containing an infrared absorbing agent, or a print layer containing an infrared absorbing agent. The coat layer containing an infrared absorbing agent or the print layer containing an infrared absorbing agent is, preferably, provided on at least one surface of a transparent base film.

Infrared absorbing agents include inorganic infrared absorbing agents and organic absorbing agents. Inorganic absorbing agents can include, for example, tin oxide, indium oxide, magnesium oxide, titanium oxide, chromium oxide, zirconium oxide, nickel oxide, aluminum oxide, zinc oxide, iron oxide, antimony oxide, lead oxide, and bismuth oxide. Organic infrared absorbing agents can include, for example, phthalocyanines, naphthalocyanines, and anthraquinones.

Inorganic infrared absorbing agents are, preferably, particulate. The average particle diameter is, preferably, in a range between about 0.005 and about 1 micrometer, more preferably, in a range between about 0.01 and about 0.5 micrometer. The particle diameter distribution of the inorganic infrared absorbing agents is, preferably, about 1 micrometer or less for increasing the transmittance of visible light.

It is preferred that: the infrared absorbing agents be highly dispersed.

The amount of an infrared absorbing agent is, preferably, in a range between about 0.5 and about 20 $g/m^2$ and, more preferably, in a range between about 1 and about 10 $g/m^2$ relative to the unit area of the window film.

The thickness of the infrared absorbing layer is not limited, but in the case of a coat layer containing an infrared absorbing agent or a print layer containing an infrared absorbing agent, the thickness of the infrared absorbing layer is in a range between about 0.5 and about 15 micrometers, preferably in a range between about 1 and about 10 micrometers. In the case of a film layer comprising a transparent base film in which an infrared absorbing agent is incorporated, the thickness of the film layer is in a range between about 5 and about 200 micrometers and, preferably, in a range between about 10 and about 100 micrometers.

Examples of transparent base films in which infrared absorbing agents can be incorporated include films or laminated films of various resins, including polyolefin resins, such as, polyethylene and polypropylene, vinyl chloride resins, styrene resins, ABS resins, polyvinyl alcohol, acrylic resins, acrylonitrile-styrene resins, vinylidene chloride resins, AAS resins, AES resins, polyurethane resins, polyvinyl butyral resins, poly-4-methylpentene-1 resins, polybutene-1 resins, vinylidene fluoride resins, vinyl fluoride resins, fluorocarbon resins, polycarbonate resins, polyamide resins, polyacetal resins, polyphenylene oxide resins, polyester resins, such as, polybutylene terephthalate and polyethylene terephthalate, polyphenylene sulfide resins, polyimide resins, polysulfone resins, and polyallylate resins. Among these films, polyester resin films, vinyl chloride resin films, and polyolefin resin films are preferred, and polyester resin films are most preferred.

A coat layer containing an infrared absorbing agent or a print layer containing an infrared absorbing agent is a layer comprising an infrared absorbing agent and a binder. The binder includes, for example, a thermoplastic resin and an ultraviolet curing resin, such as, acrylic resins, polyester resins, epoxy resins, phenolic resins, polyurethane resins, butyral resins, diallyl phthalate resins, and silicone resins. Preferred binders are acrylic resins, polyester resins, and butyral resins.

A coat layer containing an infrared absorbing agent or a print layer containing an infrared absorbing agent is, preferably, provided on at least one surface of a transparent base film. The transparent base film can be the same as the film in which an infrared absorbing agent can be incorporated, as described above.

The thickness of the transparent base film can be selected suitably and is normally in a range between about 5 and about 200 micrometers and is, preferably, in a range between about 10 and about 100 micrometers.

The window film of the present invention can be provided with a protective layer for protecting the surface of the infrared absorbing layer. The protective layer can be any layer that prevents contamination or damage and is, preferably, a transparent base film layer or transparent coat layer.

The window film of the present invention is, preferably, provided with an infrared absorbing layer on one surface of the light reflecting layer and an adhesive layer on the other surface of the light reflecting layer for adhesion to the glass surface.

The adhesive layer includes, for example, a layer containing an adhesive, such as, pressure sensitive adhesives, heat sensitive adhesives, and moisture sensitive adhesives. The pressure sensitive adhesives can be natural rubber, synthetic rubber, acrylic, polyvinyl ether, urethane, or silicone pressure sensitive adhesives. Examples of synthetic rubber pressure sensitive adhesives include styrene-butadiene rubber, polyisobutylene rubber, isobutylene-isoprene rubber, isoprene rubber, styrene-isoprene block copolymer, styrene-butadiene block copolymer, styrene-ethylene-butylene block copolymer, and ethylene-vinyl acetate elastomer. Examples of acrylic pressure sensitive adhesives include the polymers or copolymers of acrylic acid, methyl acrylate, ethyl acrylate, propyl acrylate, butyl acrylate, 2-ethylhexyl acrylate, ethyl methacrylate, butyl methacrylate, and acrylonitrile. Examples of polyvinyl ether resin pressure sensitive adhesives include polyvinyl ether and polyvinyl isobutyl ether. An example of a silicone pressure sensitive adhesive is dimethyl polysiloxane. Among these pressure sensitive adhesives, an acrylic resin pressure sensitive adhesive is preferred.

These adhesives can be used alone or in a combination of two or more adhesives.

These adhesives can contain tackifiers, fillers, softening agents, heat and light stabilizers, antioxidants, or cross-linking agents, as required. The tackifiers include rosins, terpene-phenolic resins, terpene resins, aromatic hydrocarbon modified terpene resins, petroleum resins, coumarone-indene resins, styrene resins, phenolic resins, and xylene resins. The fillers include zinc oxide, titanium oxide, silica, calcium carbonate, and barium sulfate. The softening agents include process oil, liquid rubber, and plasticizers. The heat and light stabilizers include benzophenones, benzotriazoles, and hindered amines. The antioxidants include anilides, phenols, phosphites, and thioesters.

The adhesive layer can be provided by various methods, including a method in which an adhesive dissolved in a suitable solvent is applied to the base film, a method in which an adhesive dispersed or emulsified in a suitable medium is applied to the base film, a method in which an adhesive is applied with calendar rolls without using solvents, a method in which an adhesive layer formed on a release liner is transferred, and a method in which a double-sided adhesive tape is overlaid on a base film.

The thickness of the adhesive layer is not limited to a specific thickness, but is normally in a range between about 10 and about 100 micrometers, preferably in a range between about 20 and about 50 micrometers.

A release layer can be applied on the surface of the adhesive layer.

The window film of the present invention can be provided with a heat sensitive adhesive layer or a moisture sensitive adhesive layer as the adhesive layer described above.

Heat sensitive adhesives used in the heat sensitive adhesive layer can be various heat sensitive homopolymers or copolymers, such as, ethylene-vinyl acetate copolymers, ethylene-acrylic ester copolymers, phenoxy resins, nylon 11, nylon 12, saturated polyesters, coumarone-indene resins, rosins, styrene-isoprene-styrene copolymer rubber, styrene-butadiene-styrene copolymer rubber, polyethylene resins, and polyurethane resins. Among these materials, ethylene-vinyl acetate copolymers and ethylene-acrylic ester copolymers are preferred.

Moisture sensitive adhesives used in the moisture sensitive adhesive layer can be various moisture sensitive adhesives, such as, polyacrylamide, polyacrylic acid, polyacrylate esters, polyvinyl alcohol, polyvinyl ether, cellulose derivatives, and processed starch. These moisture sensitive adhesives can be used alone or in combination with each other or with one or more other materials.

The heat sensitive and moisture sensitive adhesive layers can contain tackifiers, fillers, softening agents, heat and light stabilizers, antioxidants, or cross-linking agents, as required. These additives are the same as the additives for the above-mentioned adhesives.

The adhesion force of the heat sensitive adhesives is induced by heating and causes a firm adhesion to articles.

The adhesion force of the moisture sensitive adhesives is induced by solvents, such as, water and causes a firm adhesion to articles.

The thickness of the heat sensitive and moisture sensitive adhesive layers can be selected to suit a particular purpose. The thickness of an adhesive layer is normally in a range between about 3 and about 100 micrometers and, preferably, in a range between about 5 and about 50 micrometers.

Since the heat sensitive adhesives have no adhesion force at normal temperatures and since the moisture sensitive adhesives have no adhesion force unless they are exposed to solvents, these adhesives do not adhere to articles even if the adhesive is in contact with another member. Therefore, the application of a release liner to the surface is not required.

The heat sensitive and moisture sensitive adhesive layers can be provided by various methods. For example, these layers can be provided by the same method as in the method for providing the above adhesive layers.

When a double-sided adhesive tape, provided with a heat sensitive layer or a moisture sensitive adhesive layer, is used for lamination, the heat sensitive or moisture sensitive adhesive layer on either side can be replaced by a pressure sensitive adhesive layer.

In the window film of the present invention, the light reflecting layer and the adhesive layer can be laminated directly, or can be laminated via an intervening transparent base film, which can be the same as the one described above.

The thickness of this transparent base film can be selected to suit a particular purpose and is normally in a range between about 5 and about 200 micrometers and, preferably, in a range between about 10 and about 100 micrometers.

Typical constitutions of the window films of the present invention will be described referring to sectional views of FIGS. 1 through 4.

The embodiment shown in FIG. 1 is a window film comprising an infrared absorbing layer 2 composed of a coat layer containing an infrared absorbing agent laminated on one side of a light reflecting layer 1, a transparent base film 3 laminated on the other side of the light reflecting layer 1, and a pressure sensitive adhesive layer as an adhesive layer 4 laminated on the surface of the transparent base film 3.

Figure 2:
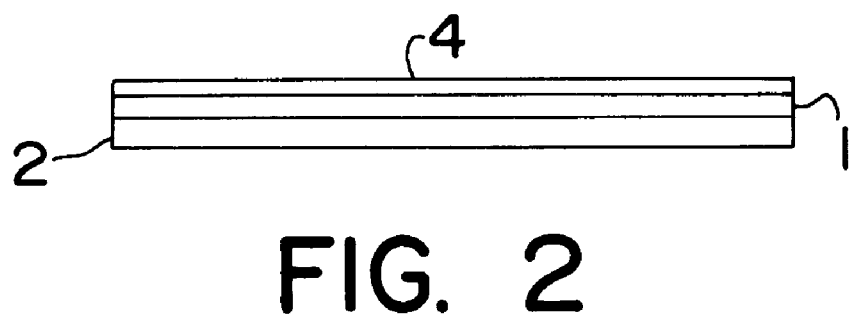
FIG. 2 shows a sectional view of another embodiment of a window film according to the present invention.

The embodiment shown in FIG. 2 is a window film comprising an infrared absorbing layer 2 composed of a transparent base film containing an infrared absorbing agent laminated on one side of a light reflecting layer 1, and a heat sensitive adhesive layer as an adhesive layer 4 laminated on the surface of the other side of the light reflecting layer 1.

Figure 3:
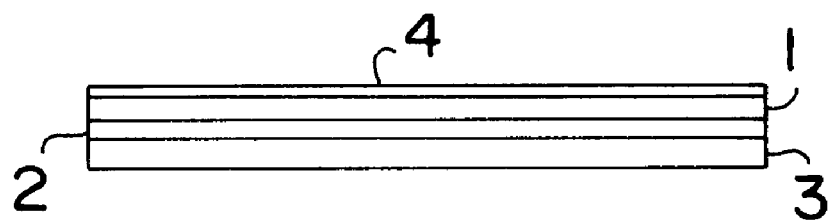
FIG. 3 shows a sectional view of another embodiment of a window film according to the present invention.

The embodiment shown in FIG. 3 is a window film comprising an infrared absorbing layer 2 composed of a coat layer containing an infrared absorbing agent laminated on one side of a light reflecting layer 1, a transparent base film 3 laminated on the surface of the infrared absorbing layer 2, and a pressure sensitive adhesive layer as an adhesive layer 4 laminated on the other surface of the light reflecting layer 1.

Figure 4:
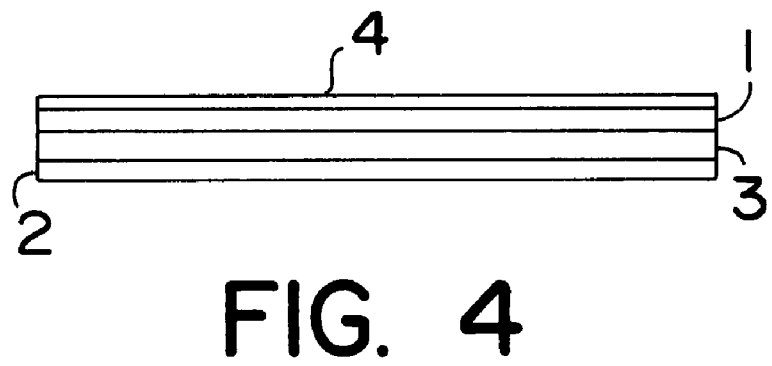
FIG. 4 shows a sectional view of another embodiment of a window film according to the present invention.

The embodiment shown in FIG. 4 is a window film comprising a transparent base film 3 laminated on the one side of a light reflecting layer 1, an infrared absorbing layer 2 laminated on the transparent base film 3, and a moisture sensitive adhesive layer as an adhesive layer 4 laminated on the other surface of the light reflecting layer 1.

Alternatives to the embodiments of the invention shown in FIGS. 1 through 4, comprise the substitution of a print layer containing an infrared absorbing agent in place of a coat layer containing an infrared absorbing agent. Such alternative embodiments are included as examples of the invention.

Each layer constituting the window films can be laminated via an intervening adhesive layer or can be laminated directly without intervening adhesive layers.

If the anchoring force between each layer and the adhesive layer is insufficient, the surface of each layer to be coated with the adhesive can be treated with corona discharge or can be provided with a primer layer by applying a primer mainly composed of polyester, urethane, or chlorinated polyolefin and containing a filler, as required. Various fillers can be used for this purpose, including silica, calcium carbonate, magnesium carbonate, kaolin, sintered clay, bentonite, zeolite, talc, and diatomaceous earth.

The transmittance of visible light through the window film of the present invention is, preferably, in a range between about 10 and about 80 percent, more preferably, in a range between about 15 and about 55 percent.

The window films of the present invention can be used in various applications. A particularly advantageous application of these window films is in curved glass windows for the doors of motor vehicles.

Accordingly, the present invention also provides a method for the absorption of infrared rays by using the window films of the present invention on window glass, preferably the curved window glass of the doors of motor vehicles.

The effect of the window film of the present invention when used for curved glass windows for the doors of motor vehicles is described below.

When the doors of a motor vehicle are closed, a part or most of the sunlight is reflected by the light reflecting layer of the window film adhered to the transparent curved glass window. The thickness of the light reflecting layer is adjusted to transmit a part or most of the sunlight, and the rest of the sunlight transmitted through the light reflecting layer is transmitted through the infrared absorbing layer and enters the vehicle. Therefore, the occupants can see outside from inside the vehicle.

On the other hand, when the door of the motor vehicle is open, sunlight irradiates the inside surface of the window film adhered to the curved glass window. Infrared rays are absorbed by the infrared absorbing layer, and visible light, ultraviolet light, and infrared rays that have not been absorbed are reflected by the light reflecting layer, transmitted through the infrared absorbing layer, and, then, enter the vehicle. The use of the window film of the present invention efficiently absorbs infrared rays because the sunlight passes through the infrared absorbing layer twice before coming out as reflected light. The window film of the invention provides this result because it comprises an infrared absorbing layer, a light reflecting layer, and glass, in that order from the inside of the vehicle. Therefore, few, if any, infrared rays reach the inside of the vehicle, thus preventing any significant rise in the temperature of articles therein and reducing the probability of their ignition.

If an ultraviolet absorbing agent is added to the infrared absorbing layer, the transparent base film, or the adhesive layer, or if an ultraviolet absorbing layer is provided, the discoloration of articles in the vehicle, or the sunburn of the passengers, can be prevented.

The present invention is described more specifically by reference to embodiments thereof. It should be noted that the present invention is not intended to be limited by these examples.

EXAMPLE 1

On a transparent base film 3 (a polyester resin film, "Lumilar T-60," from Toray Industries, Inc. having a thickness of 50 micrometers), a light reflecting layer 1 was formed by the vapor deposition of aluminum to a visible light transmittance of 18 percent (thickness of aluminum layer: 0.018 micrometer), and the surface of the light reflecting layer 1 was coated with an ultraviolet curing acrylic resin ("SH-1" from Sumitomo Osaka Cement Co., Ltd.) in which fine tin oxide powder (average particle diameter: 0.2 micrometer, particle diameter distribution: 0.01 to 0.5 micrometer) is dispersed, so that the thickness became 7 micrometers after curing using a Meyer bar, cured by the irradiation of ultraviolet rays to form an infrared absorbing layer 2. The amount of dispersed tin oxide was 3.5 g/m$^2$.

Next, an acrylic pressure sensitive adhesive comprising 100 parts by weight of an acrylic ester base copolymer, "T-717," from Saiden Chemical Industry Co., Ltd., and 1.0 part by weight of "Collonate L" from Nippon Polyurethane Industry Co., Ltd. was applied to the surface of the transparent base film 3 so that the thickness became 20 micrometers after drying to form a window film.

The resulting window film is adhered to a transparent float glass of a thickness of 3 mm. and the index of light reflection was measured using a spectrophotometer, "UV-3100PC," from Shimadzu Corporation. The results are shown in Table 1. Light was radiated from the side of a transparent float glass on which no window film had been adhered and the transmittance of light through the window film was measured. The results are shown in Table 2.

The index of light reflection and transmittance were measured in accordance with JIS R3106.

EXAMPLE 2

Comparative Example

A window film was fabricated in the same manner as in Example 1 except that the infrared absorbing layer 2 was not provided.

The index of light reflection and the transmittance of light of this window film were measured in the same manner as in Example 1. The results are shown in Tables 1 and 2.

TABLE 1

| | Index of Reflection | |
|---|---|---|
| Wavelength of Light | Example 1 | Example 2 |
| 550 nm | 38% | 58% |
| 1000 nm | 41% | 60% |
| 1500 nm | 7% | 70% |
| 2000 nm | 5% | 79% |
| 2500 nm | 6% | 88% |

TABLE 2

| | Transmittance | |
|---|---|---|
| Wavelength of Light | Example 1 | Example 2 |
| 550 nm | 15% | 18% |
| 1000 nm | 8% | 10% |
| 1500 nm | 3% | 5% |
| 2000 nm | 0% | 3% |
| 2500 nm | 0% | 1% |

From Table 1, it is seen that the index of light reflection of the window film of the present invention (Example 1) substantially decreases in the infrared region, indicating that this window film significantly absorbs infrared rays.

Table 2 shows that the transmittance of light of the window film of the present invention is almost the same as the transmittance of light of the window film of Example 2 (Comparative Example), and that the transmittance of visible light does not decrease to a large extent.

The transmitted color of the window film of the present invention was only a little darker than that of the window film of the comparative example, being not very much changed and acceptable for practical purposes.

The window film of the present invention, when adhered to the inside of curved glass windows, decreases the reflection of infrared rays and reduces the intensity of condensed infrared rays, even when sunlight is radiated on the surface of the window film.

The entire disclosure of Japanese Patent Application No. Hei 8-89066, filed on Mar. 19, 1996, including the specification, claims, drawings, and summary is incorporated herein by reference in its entirety.

The invention has been described in detail with particular reference to preferred embodiments thereof, but it is understood that variations and modifications can be effected within the spirit and scope of the invention.

What is claimed is:

1. A laminate comprising:

a window glass having a convex surface and a concave surface and a window film adhered to the concave surface of said window glass, said window film comprising an infrared absorbing layer provided on one surface of a light reflecting layer and an adhesive layer for adhering the window film to the window glass provided on the other surface of the light reflecting layer;

wherein said infrared absorbing layer is a transparent resin film layer in which an infrared absorbing agent is incorporated, a coat layer containing an infrared absorbing agent, or a print layer containing an infrared absorbing agent that is provided on at least one surface of a transparent resin film and has a thickness in the range between 0.5 and 200 micrometers and said light reflecting layer has a thickness in the range between 0.001 and 0.1 micrometer;

whereby reflection of infrared rays is minimized and intensity of condensed infrared rays is reduced when the concave surface of said window is irradiated by sunlight.

2. The laminate of claim 1 wherein the visible light transmittance of the light reflecting layer is in the range of from about 10 to about 80 percent.

3. The laminate of claim 1 wherein the infrared absorbing layer can absorb infrared rays with an infrared absorbancy of about 80 percent or more.

4. The laminate of claim 1 wherein the infrared absorbing layer is a transparent base film layer in which an infrared absorbing agent is incorporated, a coat layer containing an infrared absorbing agent, or a print layer containing an infrared absorbing agent.

5. The laminate of claim 4 wherein the infrared absorbing agent is an inorganic, particulate, infrared absorbing agent having an average particle diameter in the range of from about 0.005 to about 1 micrometer.

6. The laminate of claim 4 wherein the infrared absorbing agent is present in the range of from about 0.5 to about 20 g/m$^2$, relative to the unit area of the window film.

7. A laminate comprising:

a window glass having a convex surface and a concave surface and a window film adhered to the concave surface of said window glass, said window film comprising an infrared absorbing layer provided on one surface of a light reflecting layer via an intervening transparent base film and an adhesive layer for adhering the window film to the window glass provided on the other surface of the light reflecting layer; wherein said infrared absorbing layer is a transparent resin film layer in which an infrared absorbing agent is incorporated, a coat layer containing an infrared absorbing agent, or a print layer containing an infrared absorbing agent that is provided on at least one surface of a transparent resin film and has a thickness in the range between 0.5 and 200 micrometers and said light reflecting layer has a thickness in the range between 0.001 and 0.1 micrometer;

whereby reflection of infrared rays is minimized and intensity of condensed infrared rays is reduced when the concave surface of said window is irradiated by sunlight.

8. The laminate of claim 7 wherein the visible light transmittance of the light reflecting layer is in the range of from about 10 to about 80 percent.

9. The laminate of claim 7 wherein the infrared absorbing layer can absorb infrared rays with an infrared absorbancy of about 80 percent or more.

10. The laminate of claim 7 wherein the infrared absorbing layer is a transparent base film layer in which an infrared absorbing agent is incorporated, a coat layer containing an infrared absorbing agent, or a print layer containing an infrared absorbing agent.

11. The laminate of claim 10 wherein the infrared absorbing agent is an inorganic, particulate, infrared absorbing agent having an average particle diameter in the range of from about 0.005 to about 1 micrometer.

12. The laminate of claim 10 wherein the infrared absorbing agent is present in the range of from about 0.5 to about 20 $g/m^2$, relative to the unit area of the window film.

13. A laminate comprising:

a window glass having a convex surface and a concave surface and a window film adhered to the concave surface of said window glass, said window film comprising an infrared absorbing layer provided on one surface of a light reflecting layer and an adhesive layer for adhering the window film to the window glass provided on the other surface of the light reflecting layer via an intervening transparent base film; wherein said infrared absorbing layer is a transparent resin film layer in which an infrared absorbing agent is incorporated, a coat layer containing an infrared absorbing agent, or a print layer containing an infrared absorbing agent that is provided on at least one surface of a transparent resin film and has a thickness in the range between 0.5 and 200 micrometers and said light reflecting layer has a thickness in the range between 0.001 and 0.1 micrometer;

whereby reflection of infrared rays is minimized and intensity of condensed infrared rays is reduced when the concave surface of said window is irradiated by sunlight.

14. The laminate of claim 13 wherein the visible light transmittance of the light reflecting layer is in the range of from about 10 to about 80 percent.

15. The laminate of claim 13 wherein the infrared absorbing layer can absorb infrared rays with an infrared absorbancy of about 80 percent or more.

16. The laminate of claim 13 wherein the infrared absorbing layer is a transparent base film layer in which an infrared absorbing agent is incorporated, a coat layer containing an infrared absorbing agent, or a print layer containing an infrared absorbing agent.

17. The laminate of claim 16 wherein the infrared absorbing agent is an inorganic, particulate, infrared absorbing agent having an average particle diameter in the range of from about 0.005 to about 1 micrometer.

18. The laminate of claim 16 wherein the infrared absorbing agent is present in the range of from about 0.5 to about 20 $g/m^2$, relative to the unit area of the window film.

* * * * *